United States Patent
Koo et al.

(10) Patent No.: US 9,480,105 B2
(45) Date of Patent: Oct. 25, 2016

(54) METHOD AND APPARATUS FOR REMOTELY CONTROLLING CONSUMER ELECTRONICS DEVICE BY USING WIRELESS PERSONAL AREA NETWORK

(75) Inventors: Bon-hyun Koo, Suwon-si (KR); Yong-suk Park, Seoul (KR); Tae-shik Shon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 690 days.

(21) Appl. No.: 13/360,845

(22) Filed: Jan. 30, 2012

(65) Prior Publication Data

US 2012/0196536 A1 Aug. 2, 2012

(30) Foreign Application Priority Data

Jan. 28, 2011 (KR) .................. 10-2011-0008963

(51) Int. Cl.
| | |
|---|---|
| *H04B 7/00* | (2006.01) |
| *H04W 84/18* | (2009.01) |
| *H04L 29/12* | (2006.01) |
| *H04L 29/08* | (2006.01) |
| *H04L 12/28* | (2006.01) |
| *H04W 8/00* | (2009.01) |

(Continued)

(52) U.S. Cl.
CPC .......... *H04W 84/18* (2013.01); *H04L 12/2803* (2013.01); *H04L 61/106* (2013.01); *H04L 61/6004* (2013.01); *H04L 61/605* (2013.01); *H04L 61/6081* (2013.01); *H04L 67/125* (2013.01); *H04L 67/28* (2013.01); *G08C 2201/40* (2013.01); *H04M 1/72533* (2013.01); *H04M 11/007* (2013.01); *H04W 8/005* (2013.01)

(58) Field of Classification Search
CPC .... H04L 61/10; H04L 61/6081; H04L 67/28
USPC .................................................... 455/41.2
See application file for complete search history.

(56) References Cited

U.S. PATENT DOCUMENTS 7,835,751 B2 * 11/2010 Ibe .................. H04W 36/14
370/338
2002/0103850 A1 8/2002 Moyer et al.

(Continued)

FOREIGN PATENT DOCUMENTS

| | | |
|---|---|---|
| CN | 101217297 A | 7/2008 |
| EP | 1187414 A1 | 3/2002 |

(Continued)

OTHER PUBLICATIONS

International Search Report (PCT/ISA/210 and PCT/ISA/237)), dated Sep. 27, 2012, issued by the International Searching Authority in corresponding International Application No. PCT/KR2012/000651.
ZigBee Alliance, "ZigBee RF4CE Specification Version 1.00," ZigBee Document 094945r00ZB, ZigBee Alliance, Inc., Mar. 17, 2009, 101 pages.

(Continued)

*Primary Examiner* — Eugene Yun
(74) *Attorney, Agent, or Firm* — Sughrue Mion, PLLC

(57) ABSTRACT

A method and apparatus for communicating with a target device in a personal area network (PAN), when a multi-function remote controller (MRC) is outside the coverage area of the target device. The apparatus includes a proxy device which automatically forms a virtual PAN by setting up a pairing link with the target device to control the target device. Accordingly, a user may continuously control the target device irrespective of the location of the MRC.

8 Claims, 10 Drawing Sheets

(51) Int. Cl.
*H04M 1/725* (2006.01)
*H04M 11/00* (2006.01)

(56) References Cited

U.S. PATENT DOCUMENTS

| | | |
|---|---|---|
| 2004/0203950 A1 | 10/2004 | Chen |
| 2005/0285734 A1 | 12/2005 | Sheynman et al. |
| 2008/0235358 A1 | 9/2008 | Moribe et al. |
| 2009/0141741 A1* | 6/2009 | Kim .................. H04L 29/12943 370/474 |
| 2010/0061272 A1* | 3/2010 | Veillette ........................ 370/254 |

FOREIGN PATENT DOCUMENTS

| | | |
|---|---|---|
| EP | 2 247 035 A1 | 11/2010 |
| KR | 10-2008-0010695 A | 1/2008 |
| KR | 10-2011-0048255 A | 5/2011 |
| WO | 2010108235 A1 | 9/2010 |

OTHER PUBLICATIONS

Communication dated Jan. 7, 2016 issued by the European Patent Office in counterpart European Patent Application No. 12739202.5.

* cited by examiner

FIG. 5

| Octets : 1 | 1 | 2 | 1 | 2 | 2 | 1 | 1 | Variable | 1 | 1 |
|---|---|---|---|---|---|---|---|---|---|---|
| Control Msg | Sequence number | Sender Number | Virtual Source PAN ID | Receiver Number | Target Address | Virtual Destination PAN ID | RRC Command Code | RRC Command payload | Index | Msg. Authentication Code |
| | | Virtual Address Message Field | | | | | | | | |
| | EA Header | | | | | | | EA payload | | EAR |

FIG. 6

```
<? xml version="1.0" encoding="utf-8"?>
<soap:Envelope xmlns:xsi="http://www.w3.org/2001/XMLSchema-instance" xmlns:xsd='
<soap:Body>
  <RF4CE_Extended_Command xmlns="http://www.samsungRF4CE.org/">
    <Control_Msg>string</Control_Msg>
    <Sequence_Number>int</Seuence_Number>
    <Sender_Number>int</Sender_Number>
    <Virtual_PAN_Source_Address>string</Virtual_PAN_Source_Address>
    <Receiver_Num>int</Receiver_Num>
    <Target_Address>string</Target_Address>
    <Virtual_PAN_Destination_Address>string</Virtual_PAN_Destination_Address>
    <RRC_Command_Code>string</RRC_Command_Code>
    <RRC_Command_Payload>string</RRC_Commang_Payload>
    <Index>string</Index>
    <Msg_Authentication_Code>string</Msg_Authentication_Code>
  </RF4CE_Extended_Command>
</soap:Body>
</soap:Envelope>
```

FIG. 8A

| PAN ID | Virtual PAN ID |
|--------|----------------|
| 0x01   | 0x01           |
| 0x02   | 0x03           |
| 0x03   | 0x05           |
| ⋮      | ⋮              |
| 0xN    | 0xM            |

FIG. 8B

| Ref. Num | Device Address | Device Type |
|----------|----------------|-------------|
| 00       | 0x00000001     | TV          |
| 01       | 0x00000002     | HTS         |
| 02       | 0x00000003     | E-FAN       |
| ⋮        | ⋮              | ⋮           |
| N        | 0xNNNNNNNN     | N           |

METHOD AND APPARATUS FOR REMOTELY CONTROLLING CONSUMER ELECTRONICS DEVICE BY USING WIRELESS PERSONAL AREA NETWORK

CROSS-REFERENCE TO RELATED PATENT APPLICATION

This application claims priority under 35 U.S.C. §119(a) from Korean Patent Application No. 10-2011-0008963, filed on Jan. 28, 2011, in the Korean Intellectual Property Office, the disclosure of which is incorporated herein in its entirety by reference.

BACKGROUND

1. Field

Exemplary embodiments relate to a method and apparatus for controlling consumer electronics device by using a wireless personal area network (PAN).

2. Description of the Related Art

In related art, wireless communication using infrared (IR) light is used to control consumer electronics devices. However, research has recently been conducted on technologies for controlling consumer electronics devices by using radio frequency (RF).

For example, technologies for controlling various consumer electronics devices with low power consumption in a wireless PAN defined in the IEEE 802.15.4 standard are defined in the Zigbee radio frequency for consumer electronics (RF4CE) standard.

FIG. 1 is a diagram illustrating a structure of a remote control (RC) PAN according to the Zigbee RF4CE standard.

As shown in FIG. 1, a TV remote controller (RC), a TV, a digital versatile disc (DVD), and a multi-function RC (MRC) constitute a PAN 1, the MRC, a compact disc (CD), and a CD RC constitute a PAN 2, and a DVD RC, the TV, the DVD, and the MRC constitute a PAN 3. The MRC, which is a controller node for controlling various devices, may control the TV, the CD, and DVD. In the RC PAN, target nodes, such as the TV, the DVD, and the CD, may create PANs by themselves, and other target nodes or controller nodes may participate in corresponding PANs by pairing with target nodes that manage the PANs. In the RC PAN, a structure of a frame for communication between nodes is defined in the Zigbee RF4CE standard. FIG. 2 illustrates such a structure.

As such, RF communication used to control consumer electronics devices has no linearity unlike IR communication. An MRC capable of controlling various devices may be easily applied as software to a smartphone and the like.

However, since the coverage area of a wireless PAN is typically about 100 M, if a user is far from his or her home beyond the coverage area, a consumer electronics device used by the user may not be controlled. Since various control modules are recently installed as hardware/software in mobile phones such as smartphones, there is a demand for a method of remotely controlling a consumer electronics device according to an existing wireless PAN technology, without adding a separate function to the consumer electronics device.

SUMMARY

One or more exemplary embodiments relate to providing a method and apparatus for enabling a control device to remotely control a target device via a wireless PAN.

Additional features will be set forth in the following description, and in part will be even more apparent from the examples set forth, or may be learned by practice of the exemplary embodiments.

According to an aspect of an exemplary embodiment, there is provided a method for controlling a target device, the method including: determining whether the target device is within a coverage area of a control device; generating a message for enabling a proxy device to communicate with the target device via the wireless PAN based on a result of the determination; and transmitting the message to the proxy device.

The message may be an extended markup language (XML)-based message including information for a multi-function remote controller (MRC) to control the target device according to a Zigbee RF4CE standard.

The information may include mapping information respectively corresponding to a destination PAN identifier, a destination address, a source PAN identifier, and a source address in a mapping table managed by the proxy device.

The mapping information corresponding to the source address may be a number of a sender of the message that is transmitted by using the SMS.

The determining may include determining whether the target device is within the coverage area based on whether a discovery process according to a Zigbee RF4CE standard is successfully performed by the control device.

The message may be transmitted using a short message service (SMS).

According to an aspect of another exemplary embodiment, there is provided a computer-readable recording medium having embodied thereon a computer program for executing the method.

According to an aspect of another exemplary embodiment, there is provided a control device for controlling a target device, the control device including: a determining unit which determines whether the target device is within a coverage area of the control device; a message generating unit which generates a message for enabling a proxy device to communicate with the target device via the wireless PAN based on a result of the determination; and a processing unit which transmits the message to the proxy device.

The message may be an XML-based message including information for an MRC to control the target device according to a Zigbee RF4CE standard.

The information may include mapping information respectively corresponding to a destination PAN identifier, a destination address, a source PAN identifier, and a source address in a mapping table managed by the proxy device.

The mapping information corresponding to the source address may be a number of a sender of the message that is transmitted.

The determining unit may determine whether the target device is within the coverage area based on whether a discovery process according to a Zigbee RF4CE standard is successfully performed by the control device.

The message may be transmitted using a short message service (SMS).

According to an aspect of another exemplary embodiment, there is provided a method for relaying information between a control device and a target device via a wireless PAN, the method including: extracting mapping information from an message received from the control device; acquiring address information for communicating with the target device via the wireless PAN based on the mapping information and a predetermined mapping table; and transmitting a request message included in the received message to the target device using the address information.

The address information may include a destination PAN identifier, a destination address, a source PAN identifier, and a source address needed for an MRC to control the target device according to a Zigbee RF4CE.

The mapping information corresponding to the source address may be a number of a sender of the SMS message.

The request message included in the received message may be a discovery request message, a pairing request message, or a command request message according to a Zigbee RF4CE standard.

The method may further include transmitting a response message received from the target device to the request message to the control device.

The received message may be a short message service (SMS).

According to an aspect of another exemplary embodiment, there is provided a computer-readable recording medium having embodied thereon a computer program for executing the method.

According to an aspect of another exemplary embodiment, there is provided a proxy device for relaying information between a control device and a target device via a wireless PAN, the proxy device including: a processing unit which extracts mapping information a message received from the control device; a mapping unit which acquires address information for communicating with the target device via the wireless PAN based on the mapping information and a predetermined mapping table; and a transmitting unit which transmits a request message included in the received message to the target device by using the address information.

The address information may include a destination PAN identifier, a destination address, a source PAN identifier, and a source address needed for an MRC to control the target device according to a Zigbee RF4CE standard.

The mapping information corresponding to the source address may be a number of a sender of the received message.

The request message included in the received message may be a discovery request message, a pairing request message, or a command request message according to a Zigbee RF4CE standard.

The transmitting unit may transmit a response message received from the target device to the request message to the control device.

The received message may be a short message service (SMS).

BRIEF DESCRIPTION OF THE DRAWINGS

The above and other features and advantages of the exemplary embodiments will become more apparent by describing in detail exemplary embodiments thereof with reference to the attached drawings in which:

FIG. 5 is a diagram illustrating a structure of a frame transmitted by the control device to a proxy device, according to an exemplary embodiment;

FIG. 6 is a diagram illustrating the frame of FIG. 5 in an extended markup language (XML)-based message;

FIGS. 8A and 8B illustrate mapping tables managed by the proxy device, according to exemplary embodiments;

DETAILED DESCRIPTION OF EXEMPLARY EMBODIMENTS

The following detailed descriptions are provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 3:
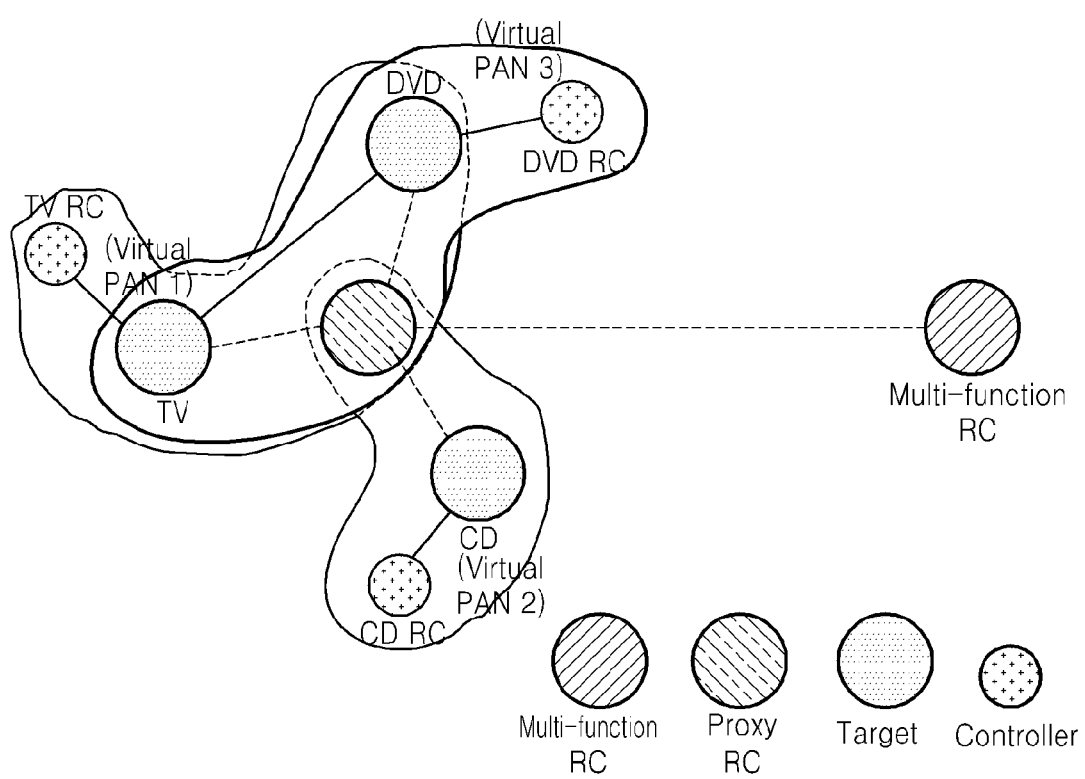
FIG. 3 is a diagram illustrating a structure of a wireless PAN according to an exemplary embodiment.

FIG. 3 is a diagram illustrating a structure of a wireless personal area network (PAN) according to an exemplary embodiment.

As shown in FIG. 3, when a control device, e.g., a multi-function remote controller (MRC), is so far from a target device, e.g., a target node, that the control device may not communicate with the target device via the wireless PAN, the control device communicates with a proxy device. The proxy device may form a virtual PAN by setting up a pairing link with the target device by using address information of the control device. That is, although the proxy device physically pairs with the target device, the target device operates as if the control device pairs with the target device.

The control device and the proxy device communicate with each other via an out-of-band channel different from a wireless PAN channel. For example, the control device and the proxy device may communicate with each other by using a short message service (SMS) via a third generation (3G) network.

Figure 4:
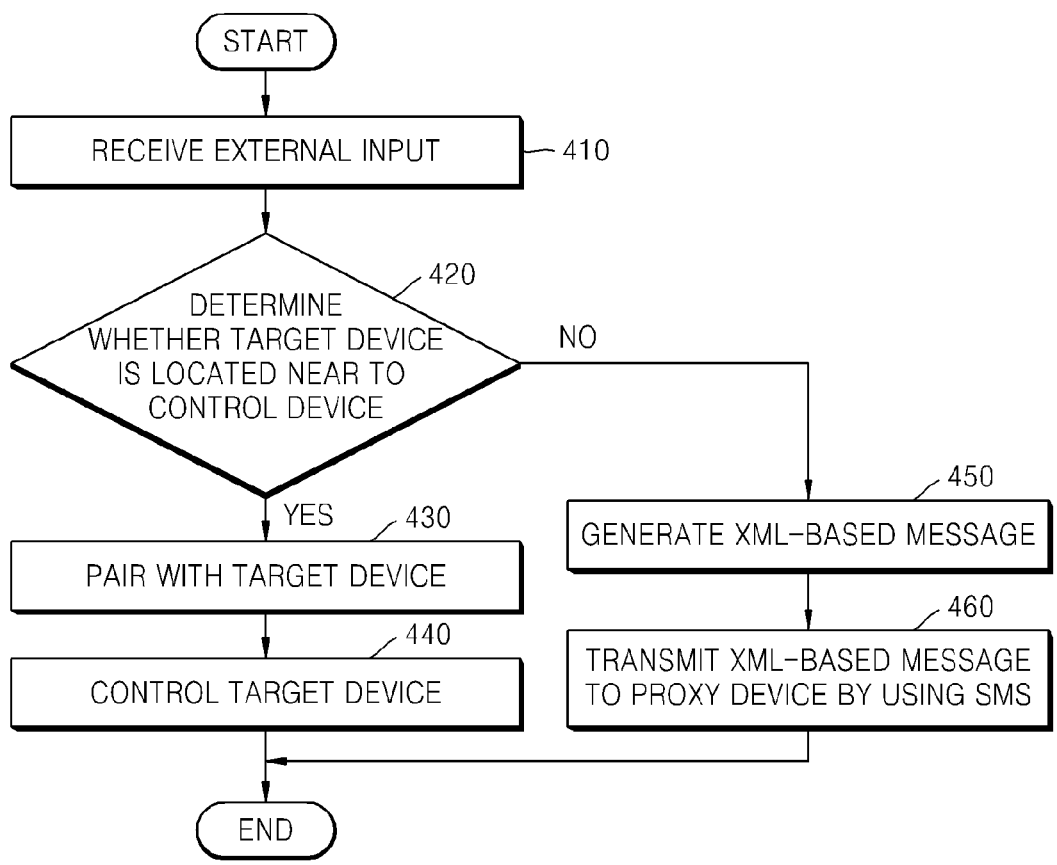
FIG. 4 is a flowchart illustrating a method by which a control device remotely controls a target device, according to an exemplary embodiment.

FIG. 4 is a flowchart illustrating a method by which a control device remotely controls a consumer electronics device, according to an exemplary embodiment.

In operation 410, the control device receives an external input for controlling the consumer electronics device through a user interface.

In operation 420, the control device determines whether a target device is located near to the control device by performing scanning That is, the control device determines whether the target device is within a coverage area in which the target device may be controlled via a wireless PAN. The determination may be a process of determining whether a discovery process according to the Zigbee RF4CE standard is successful. In detail, the control device, e.g., an MRC, broadcasts a discovery request packet to neighbors for a predetermined period of time or until a predetermined number of discovery responses are received. If no discovery response is received, it is considered that the discovery process failed. In this case, the control device is determined to be too far from home, i.e., the target device, such that the control device may not communicate with the target device via the wireless PAN.

If the discovery process is successful, the method proceeds to operation 430. In operation 430, the control device pairs with the target device.

In operation 440, the control device controls the target device via the wireless PAN.

Meanwhile, if the discovery process failed in operation 420, the control device may not directly communicate with the target device via the wireless PAN. In this case, the method proceeds to operation 450. In operation 450, the control device generates a message to be transmitted to the target device. The message may be generated based on an extended markup language (XML) so as to be generally processed in various systems and software.

Meanwhile, the message includes information needed for the control device according to the Zigbee RF4CE standard to control the target device. Since a proxy device manually relays messages between the control device and the target device and does not actively operate, the control device should provide information needed for the proxy device to communicate with the target device to the proxy device.

Figure 1:
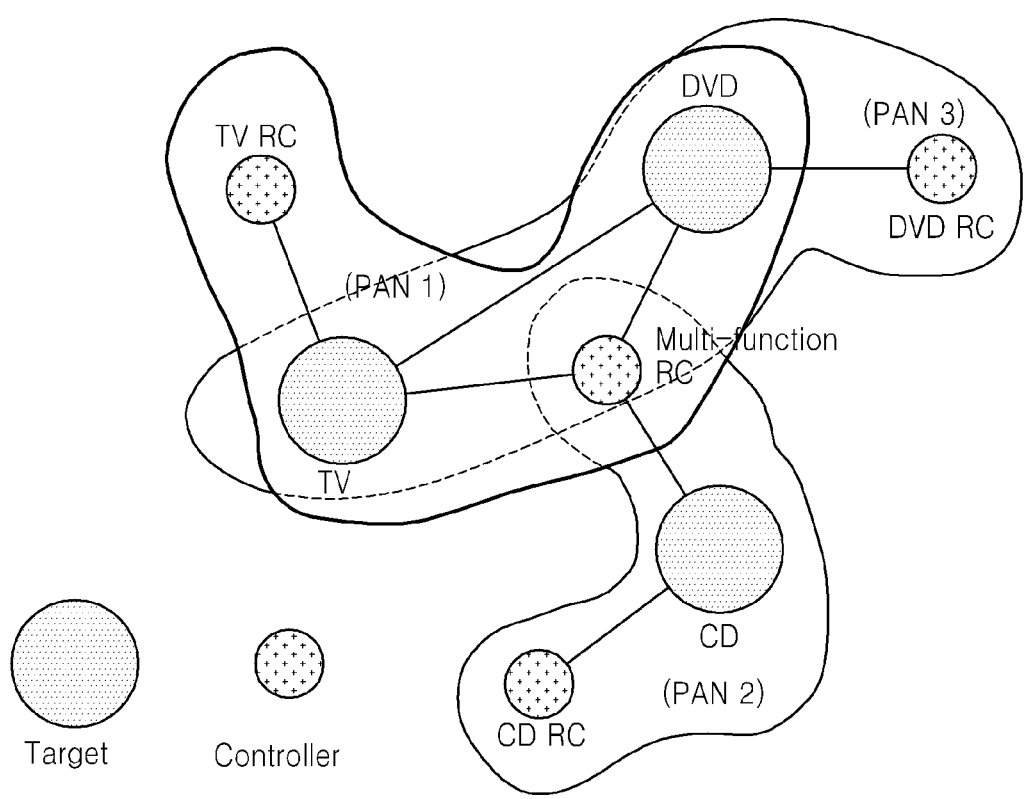
FIG. 1 is a diagram illustrating a structure of a wireless personal area network (PAN) according to a Zigbee radio frequency for consumer electronics (RF4CE) standard.
Figure 2:
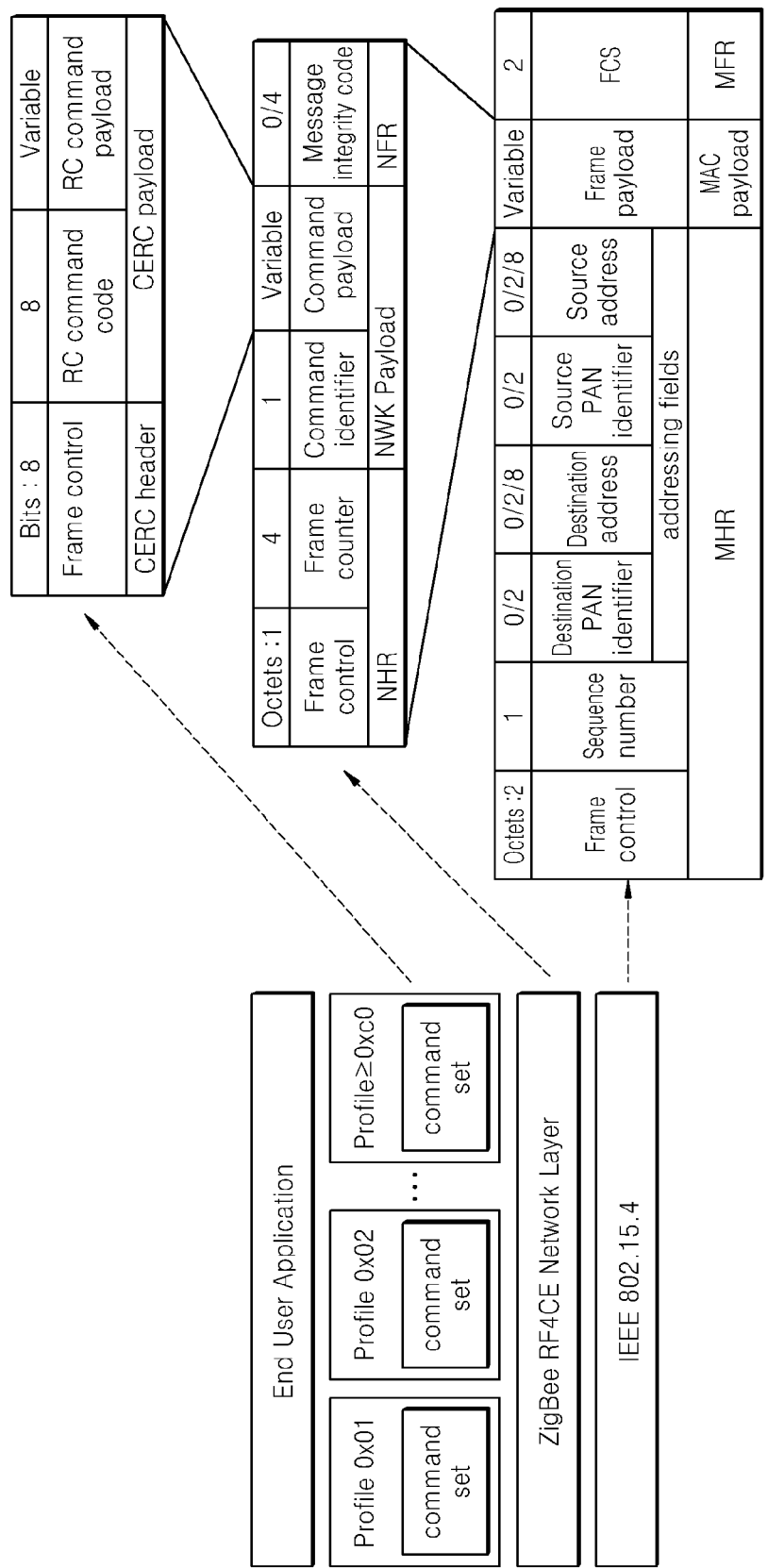
FIG. 2 is a diagram illustrating a structure of a frame for communication between nodes in a wireless PAN.

Referring to FIG. 2, the information includes a command code, a command identifier, and so on in the case of a command frame. Common address information is needed in order to perform discovery, pairing, and control processes in the wireless PAN. In detail, at least four pieces of address information, that is, a destination PAN identifier, a destination address, a source PAN identifier, and a source address, are needed. Accordingly, the control device provides the address information or mapping information needed to acquire the address information to the proxy device.

A length of a message may be reduced by providing mapping information instead of directly providing address information. Also, security may be enhanced by providing the mapping information. In other words, the risk that consumer electronics devices at home may arbitrarily operate due to messages randomly sent by others may be reduced. If the mapping information is used, the control device and the proxy device may share the same mapping table. Examples of the mapping table are shown in FIGS. 8A and 8B. That is, when the control device requests pairing with the target device or transmits a command related to the target device to the proxy device, if a virtual PAN ID is used instead of a real PAN ID and a reference number is used instead of a real device address, the proxy device detects the real PAN ID and the real device address by referring to the mapping table and uses the real PAN ID and the real device address when communicating with the target device via the wireless PAN.

In operation 460, the control device transmits the message generated in operation 450 to the proxy device by using an SMS. Since a user of the home network may not want others to easily control their consumer electronics devices at home by using an SMS message, it is preferable that the proxy device authenticates the control device by using an SMS sender number. Also, the proxy device may use the SMS sender number as mapping information corresponding to a source address.

FIG. 5 is a diagram illustrating a structure of a frame that is transmitted by the control device to the proxy device, according to an exemplary embodiment.

As shown in FIG. 5, a sender number, a virtual source PAN ID, a receiver number, a target address, and a virtual destination PAN ID are included in a virtual address message field. In general, since the control device, e.g., an MRC, is likely to be installed in a mobile home, a telephone number of the control device is used as mapping information according to a source address. As described above, the message may be transmitted to the control device by using an SMS. That is, an SMS sender number may be used as mapping information corresponding to a source address. The receiver number is a telephone number of the proxy device.

The proxy device obtains a destination address, a real source PAN ID, and a real destination PAN ID respectively from the target address, the virtual source PAN ID, and the virtual destination PAN ID by referring to mapping tables shown in FIGS. 8A and 8B.

An RRC command code, an RRC command payload, and an index, respectively are information corresponding to an RC command code, an RC command payload, and a command identifier in FIG. 2.

FIG. 6 illustrates the frame of FIG. 5 in an XML-based message. As described above, the message may be an XML-based message so as to be independently processed by the proxy device irrespective of characteristics of hardware or software.

Figure 7:
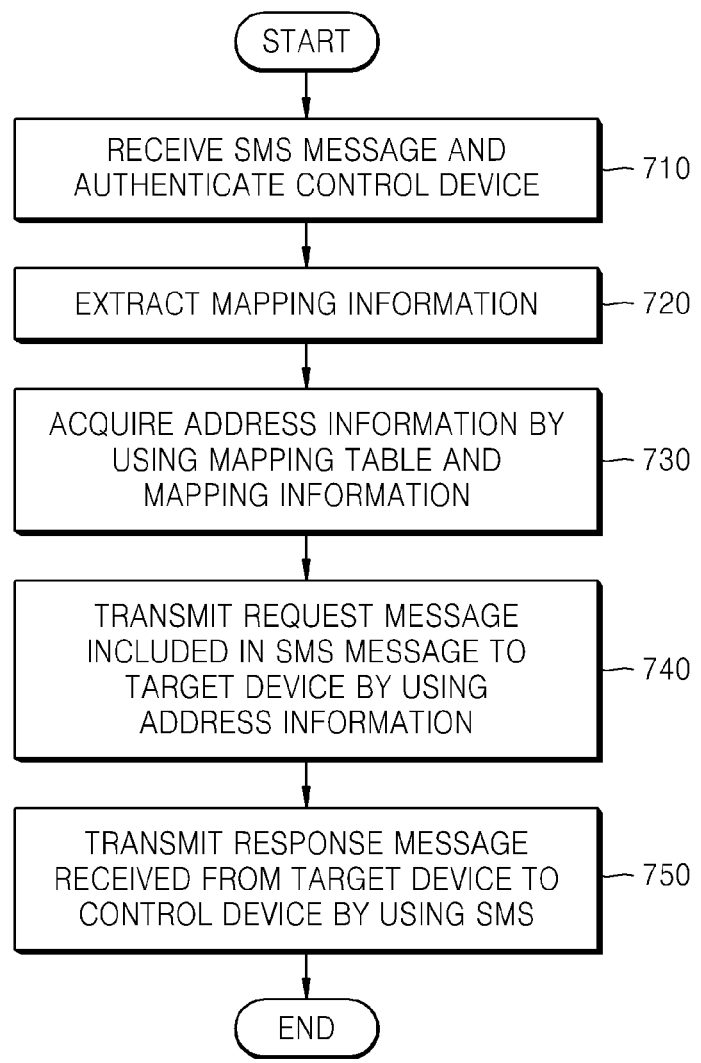
FIG. 7 is a flowchart illustrating a method by which the proxy device relays between the control device and a target device, according to an exemplary embodiment.

FIG. 7 is a flowchart illustrating a method by which the proxy device relays messages between the control device and the target device, according to an exemplary embodiment.

In operation 710, the proxy device receives an SMS message from the control device, and authenticates the control device by using a sender number of the SMS message.

In operation 720, the proxy device extracts mapping information from the SMS message.

In operation 730, the proxy device acquires address information by using a mapping table and the mapping information. In detail, the proxy device obtains a destination address, a real source PAN ID, and a real destination PAN ID respectively from a target address, a virtual source PAN ID, and a virtual destination PAN ID by referring to the mapping tables shown in FIGS. 8A and 8B. The source address may be obtained by using the sender number of the SMS message as mapping information.

In operation 740, the proxy device transmits a request message included in the SMS message by using the address information obtained in operation 730 to the target device. The request message may be a discovery request message, a pairing request message, or a command request message.

In operation 750, the proxy device transmits a response message received form the target device to the control device by using an SMS.

Figure 9:
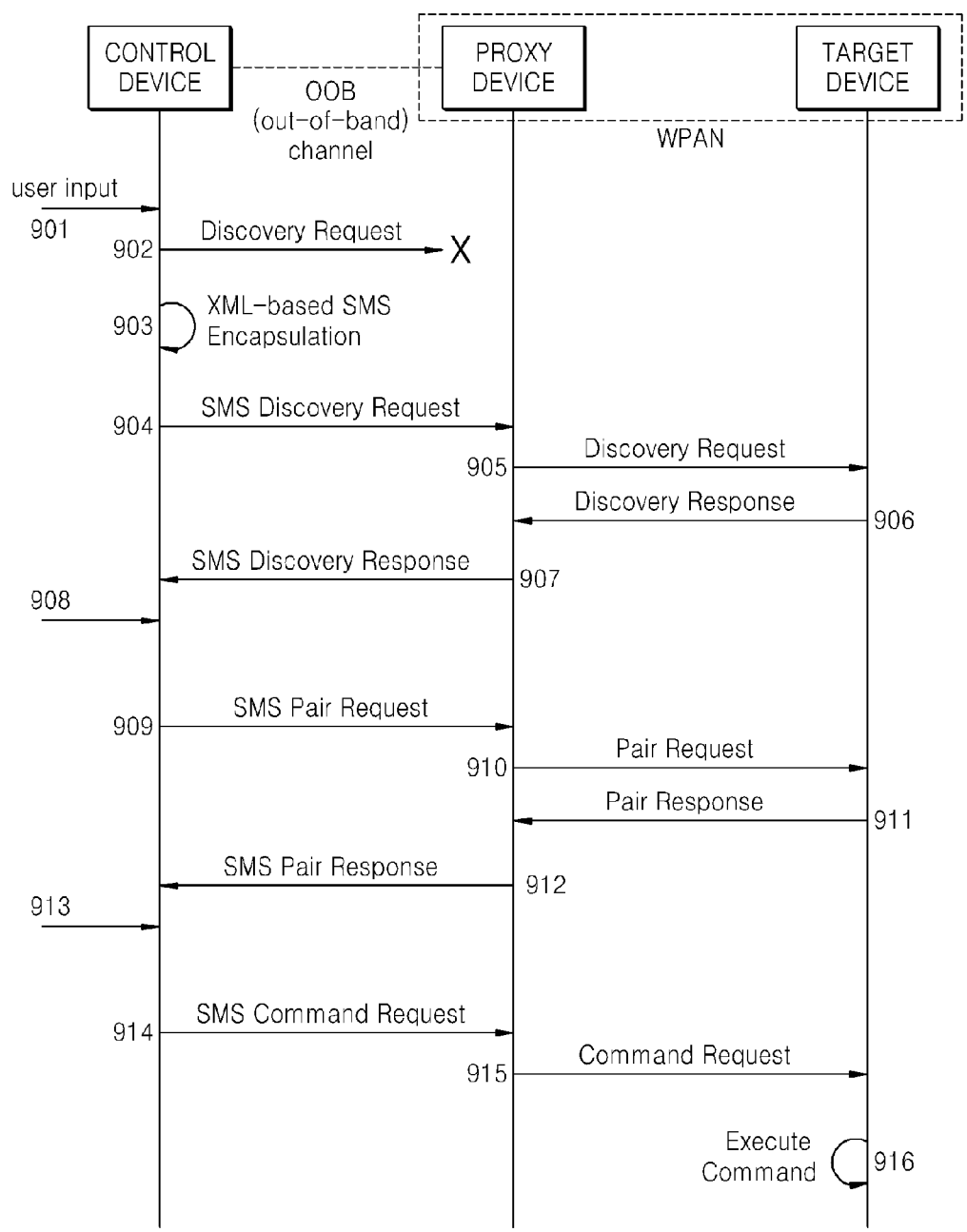
FIG. 9 is a signal flow diagram illustrating a method by which the control device controls the target device by using the proxy device, according to an exemplary embodiment.

FIG. 9 is a signal flow diagram illustrating a method by which the control device remotely controls the target device via a wireless PAN, according to an exemplary embodiment.

In operation 901, a user inputs a command through a user interface of the control device.

In operation 902, the control device broadcasts a discovery request to neighbors but fails to receive a response message.

In operation 903, the control device creates an XML-based message encapsulates the XML-based message in an SMS format. The control device recognizes that the control device may not be able physically communicate with the target device via the wireless PAN as a discovery process failed in operation 902, and a mode is automatically changed to a mode in which the proxy device control the target device.

In operation 904, the control device transmits an SMS discovery request message to the proxy device.

In operation 905, the proxy device generates a discovery request message according to a wireless PAN standard by using information extracted from the SMS discovery request message and transmits the discovery request message to the target device.

In operation 906, the target device informs the proxy device about an address and a PAN ID of the target device by transmitting a discovery response message to the proxy device.

In operation 907, the proxy device transmits an SMS response message to the discovery response message to the control device.

In operation 908, the control device receives a pairing input for pairing with the target device from the user and generates a pairing request message.

In operation 909, the control device transmits an SMS pairing request message to the proxy device.

In operation 910, the proxy device generates a pairing request message according to the wireless PAN standard by using information extracted from the SMS pairing request message and transmits the pairing request message to the target device.

In operation 911, the target device transmits a pairing response message to the proxy device.

In operation 912, the proxy device transmits an SMS pairing response message to the pairing response message to the control device.

In operation 913, the control device receives a control input related to the target device from the user and generates a command request message.

In operation 914, the control device transmits an SMS command request message to the proxy device.

In operation 915, the proxy device generates a command request message according to the wireless PAN standard by using information extracted from the SMS command request message and transmits the command request message to the target device.

In operation 916, the target device performs a command according to the command request message.

As such, even when the control device is too far from the target device so that the control device may not communicate with the target device via the wireless PAN, the target device may be automatically remotely controlled by a wireless PAN-related command input by a user. Accordingly, irrespective of whether or not the user is at home, a consumer electronics device may be continuously controlled from anywhere and at anytime.

Figure 10:
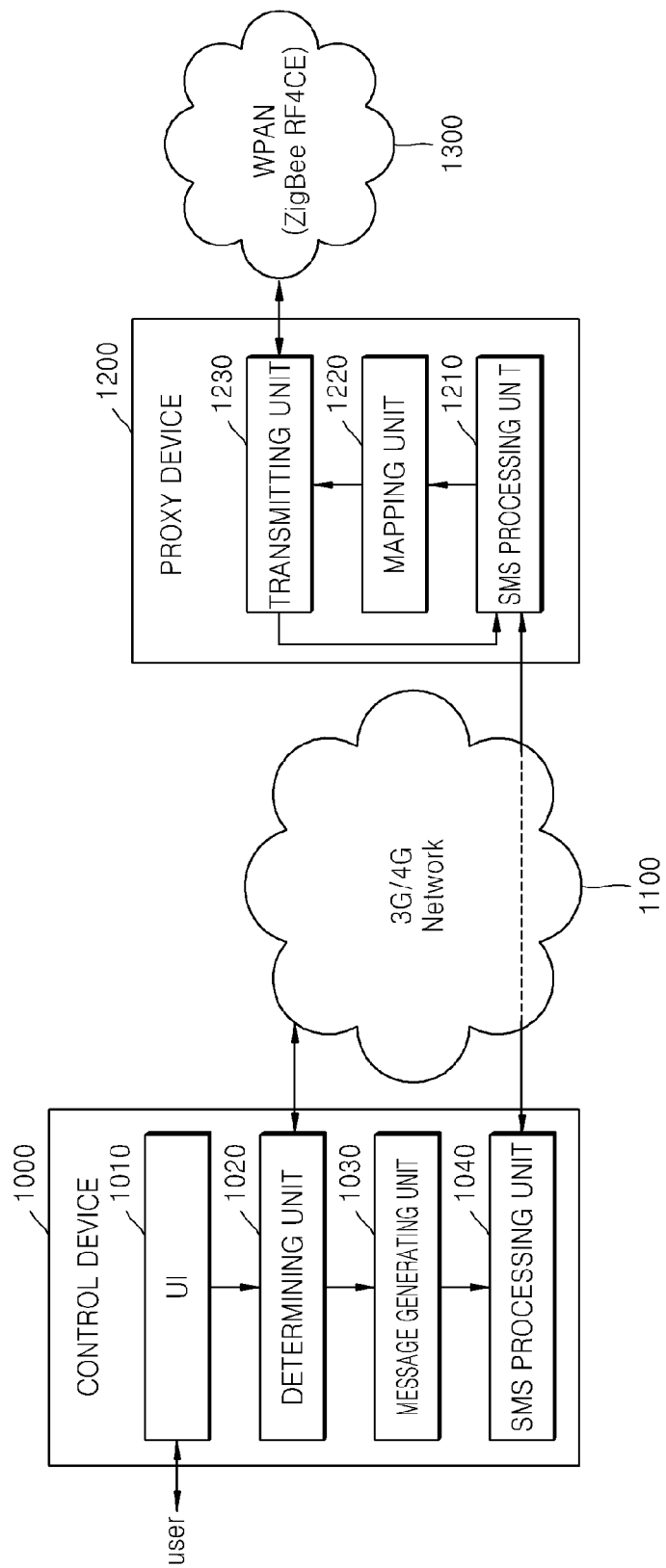
FIG. 10 is a block diagram illustrating structures of a control device and a proxy device, according to an exemplary embodiment.

FIG. 10 is a block diagram illustrating structures of a control device 1000 and a proxy device 1200, according to an exemplary embodiment.

As shown in FIG. 10, the control device 1000 includes a user interface 1010, a determining unit 1020, a message generating unit 1030, and an SMS processing unit 1040.

The user interface 1010 receives a discovery, pairing, or control request message for a target device (not shown) from a user via a keypad, a touch screen, or other input methods, and informs the user about a result of the request message.

The determining unit 1020 determines whether the target device is in a physical distance in which the target device may be controlled via a wireless PAN 1300. The determination may be performed based on whether a discovery process according to the Zigbee RF4CE standard is successfully performed by the target device. That is, according to whether a discovery response message is received within a predetermined period of time and/or a predetermined number of discovery responses are received, whether the control device 1000 may communicate with the target device via the wireless PAN 1300 is determined.

If it is determined by the determining unit 1020 that the target device is far from the control device 1000, the message generating unit 1030 generates a message for enabling the proxy device 1200 to communicate with the target device via the wireless PAN 1300.

The message includes information needed for the control device 1000, e.g., an MRC, according to the Zigbee RF4CEE standard to control the target device, and may be generated as an XML-based message. That is, the message includes a destination PAN identifier, a destination address, a source PAN identifier, and a source address, or may include mapping information needed to acquire the destination PAN identifier, the destination address, the source PAN identifier, and the source address. If the mapping information is used, the control device 1000 and the proxy device 1200 should share the same one or more mapping tables. For example, mapping information corresponding to a source address may be a telephone number of the control device 1000. That is, if the message is transmitted as an SMS message to the proxy device 1200, the proxy device 1200 obtains a source address by using an SMS sender number and the mapping table.

Meanwhile, the proxy device 1200 of FIG. 10 includes an SMS processing unit 1210, a mapping unit 1220, and a transmitting unit 1230.

The SMS processing unit 1210 extracts information needed for the control device 1000 to communicate with the target device via the wireless PAN 1300 from the SMS message. For example, address information or mapping information, a request message, or the like is extracted from the SMS message. Here, the request message may be a discovery request message, a pairing request message, or a command request message according to the Zigbee RF4CE standard. Also, the SMS processing unit 1210 transmits a response message sent from the target device that receives the request message to the control device 1000 as an SMS message.

The mapping unit 1220 acquires address information needed to communicate with the target device via the wireless PAN 1300 by using the mapping information extracted from the SMS message. The address information includes a destination PAN identifier, a destination address, a source PAN identifier, and a source address needed for the control device 1000 according to the Zigbee RF4CE standard to control the target device.

In this case, a mapping table(s) shared with the control device 1000 is referred to, and examples of the mapping table are shown in FIGS. 8A and 8B. Although not shown in FIG. 8B, in general, since the control device 1000 is likely to be installed in a mobile phone, a sender number of the SMS message, that is, a telephone number of the control device 100, may be used as a source address of the control device 1000.

The transmitting unit 1230 transmits a request message included in the SMS message by using the address information obtained by the mapping unit 1220 to the target device, and transmits a response message to the control device 100.

The method of the exemplary embodiments may be recorded as computer-readable codes on a non-transitory computer-readable recording medium, and may be embodied in a general purpose digital computer by running a program from a computer-readable medium. Alternatively, the methods of the exemplary embodiments may be embodied as computer-readable codes on a transmission media.

Examples of the non-transitory computer-readable medium include storage media such as magnetic storage media (e.g., read only memories (ROMs), floppy discs, or hard discs), optically readable media (e.g., compact disk-read only memories (CD-ROMs), or digital versatile disks (DVDs)), etc. Examples of the transmission media include carrier waves or signals for transmission over a network, such as the Internet.

The apparatuses of the exemplary embodiments, for example the control device 1000 and proxy device 1200, may include a bus coupled to every unit of the apparatus, at least one processor (e.g., central processing unit, microprocessor, etc.) that is connected to the bus for controlling the operations of the apparatuses to implement the above-described functions and executing commands, and a memory connected to the bus to store the commands, received messages, and generated messages.

While the specification exemplary embodiments has been particularly shown and described with reference to exemplary embodiments thereof using specific terms, the terms have been used to explain the exemplary embodiments and should not be construed as limiting the scope of the claims. The exemplary embodiments should be considered in a descriptive sense only and not for purposes of limitation. Therefore, the scope of the invention is defined not by the detailed description of the invention but by the appended claims, and all differences within the scope will be construed as being included in the specification.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for remotely controlling a target device, the method comprising:
   determining that the target device and a proxy device are within a wireless Personal Area Network (PAN) and a control device is outside of the PAN;
   generating, by the control device, a message that enables the proxy device to communicate with the target device via the PAN, the message comprising a target address of the target device, a virtual source PAN identifier (ID) of the control device, and a virtual destination PAN ID of the target device which are converted by the proxy device to a destination address, a real source PAN ID, and a real destination PAN ID, respectively; and
   transmitting the message to the proxy device,
   wherein the message is transmitted using a short message service (SMS) via a cellular network, and the message further comprises an SMS sender number as authentication information to obtain, from the proxy device, authentication to control the target device,
   wherein the message is generated by the control device using a mapping table that respectively corresponds the SMS sender number, the target address, the virtual source PAN ID, and the virtual destination PAN ID to a source address, the destination address, the real source PAN ID, and the real destination PAN ID, and wherein the SMS sender number, the target address, the virtual source PAN ID, and the virtual destination PAN ID are converted by the proxy device using the same mapping table.

2. The method of claim 1, wherein the message is an extended markup language (XML)-based message including information for a multi-function remote controller (MRC) to control the target device according to a Zigbee RF4CE standard.

3. The method of claim 1, wherein the determining comprises determining whether the target device is within the coverage area based on whether a discovery process according to a Zigbee RF4CE standard is successfully performed by the control device.

4. A non-transitory computer-readable recording medium having embodied thereon a computer program for executing the method of claim 1.

5. The method of claim 1, wherein the virtual destination PAN ID corresponds to an ID assigned to a virtual PAN group including the target device, the proxy device, and the control device, and the target address corresponds to a reference number uniquely assigned to the target device, and
   wherein the virtual PAN group excludes at least one target device connected to the proxy device within the wireless PAN.

6. A control device for controlling a target device, the control device comprising:
   a processor configured to determine that the target device and a proxy device are within a wireless Personal Area Network (PAN) and generate a message that enables the proxy device to communicate with the target device via the PAN, the message comprising a target address of the target device, a virtual source PAN identifier (ID) of the control device, and a virtual destination PAN ID of the target device which are converted by the proxy device to a destination address, a real source PAN ID, and a real destination PAN ID, respectively; and
   a processing unit configured to transmit the message to the proxy device,
   wherein the message is transmitted using a short message service (SMS) via a cellular network, and the message further comprises an SMS sender number as authentication information to obtain, from the proxy device, authentication to control the target device,
   wherein the message is generated by the control device using a mapping table that respectively corresponds the SMS sender number, the target address, the virtual source PAN ID, and the virtual destination PAN ID to a source address, the destination address, the real source PAN ID, and the real destination PAN ID, and
   wherein the SMS sender number, the target address, the virtual source PAN ID, and the virtual destination PAN ID are converted by the proxy device using the same mapping table.

7. The control device of claim 6, wherein the message is an XML-based message including information for multi-function remote controller (MRC) to control the target device according to a Zigbee RF4CE standard.

8. The control device of claim 6, wherein the processor determines whether the target device is within the coverage area based on whether a discovery process according to a Zigbee RF4CE standard is successfully performed by the control device.

* * * * *